(12) United States Patent
Achttien et al.

(10) Patent No.: US 11,383,851 B2
(45) Date of Patent: Jul. 12, 2022

(54) TILTROTOR CONTROL

(71) Applicant: Bell Helicopter Textron Inc., Fort Worth, TX (US)

(72) Inventors: Brent Randal Achttien, Watauga, TX (US); Chyau J. Tzeng, Arlington, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 1215 days.

(21) Appl. No.: 15/287,467

(22) Filed: Oct. 6, 2016

(65) Prior Publication Data

US 2018/0099738 A1   Apr. 12, 2018

(51) Int. Cl.
*B64D 31/04* (2006.01)
*G05G 9/047* (2006.01)
*B64C 13/04* (2006.01)
*B64C 29/00* (2006.01)
*B64C 13/30* (2006.01)

(52) U.S. Cl.
CPC .......... *B64D 31/04* (2013.01); *B64C 13/0421* (2018.01); *B64C 13/30* (2013.01); *B64C 29/0033* (2013.01); *G05G 9/047* (2013.01)

(58) Field of Classification Search
CPC ... B64D 31/04; B64C 13/24–30; B64C 13/06; G05G 9/00–047
USPC .................. 74/490.12, 490.13, 579 R, 579 E
See application file for complete search history.

(56) References Cited

U.S. PATENT DOCUMENTS

| | | | | |
|---|---|---|---|---|
| 1,536,515 A | * | 5/1925 | Methlin | B64C 13/24 244/231 |
| 2,497,127 A | * | 2/1950 | Lecarme | B64C 13/0421 244/234 |
| 2,618,447 A | * | 11/1952 | Lecarme | B64C 13/00 244/234 |
| 2,656,133 A | * | 10/1953 | Maurer | G05D 1/063 244/182 |
| 3,342,454 A | * | 9/1967 | Tutch | F02M 3/02 251/288 |
| 3,377,881 A | * | 4/1968 | Lucas | B64C 13/044 244/235 |
| 3,378,938 A | * | 4/1968 | Frasca | G09B 9/28 434/45 |

(Continued)

FOREIGN PATENT DOCUMENTS

| | | |
|---|---|---|
| EP | 2119626 A1 | 11/2009 |
| WO | 1997015492 | 5/1997 |
| WO | 2001087706 A1 | 11/2001 |

*Primary Examiner* — Richard R. Green
(74) *Attorney, Agent, or Firm* — Edwin S. Flores; Daniel J. Chalker; Chalker Flores, LLP

(57) ABSTRACT

The present invention includes a thrust control apparatus, method and kit for a tiltrotor craft comprising a thrust control handle; a first and a second bar connected to the thrust control handle and connected to a floor support; a first end of a transverse bar connected to the first bar; a linker connected to a second end of the transverse bar; and a crankbell connected to the floor support below the first and a second bars, wherein a first end of the crankbell is connected to the linker, wherein the thrust control handle has a substantially linear motion that controls engine thrust, and the crankbell transfers the substantially linear motion of the handle into a substantially perpendicular motion that engages an engine thrust control at a second end of the crankbell.

25 Claims, 7 Drawing Sheets

(56) References Cited

U.S. PATENT DOCUMENTS

| | | | |
|---|---|---|---|
| 3,404,852 A | 10/1968 | Sambell | |
| 3,797,783 A | 3/1974 | Kisovec | |
| 4,500,398 A | 2/1985 | Cole, Jr. et al. | |
| 4,979,698 A | 12/1990 | Lederman | |
| 5,000,398 A | 3/1991 | Rashev | |
| 5,054,716 A | 10/1991 | Wilson | |
| 6,644,588 B2 | 11/2003 | King et al. | |
| 6,695,264 B2 | 2/2004 | Schaeffer et al. | |
| 8,272,599 B2 | 9/2012 | Haverdings | |
| 9,051,836 B2 * | 6/2015 | Yates | B64C 13/0421 |
| 9,069,372 B2 * | 6/2015 | Spina | B64C 13/06 |
| 9,096,310 B2 * | 8/2015 | Caravella | B64C 13/0423 |

* cited by examiner

TILTROTOR CONTROL

CROSS-REFERENCE TO RELATED APPLICATIONS

None.

STATEMENT OF FEDERALLY FUNDED RESEARCH

None.

TECHNICAL FIELD OF THE INVENTION

The present invention relates in general to the field of flight control devices, and more particularly, to a novel thrust controller for tiltrotor aircraft.

BACKGROUND OF THE INVENTION

Without limiting the scope of the invention, its background is described in connection with tiltrotor aircraft.

One example is U.S. Pat. No. 8,272,599 filed by Haverdings H., and entitled, "Control lever assembly for a tiltrotor aircraft", which is said to teach a control lever assembly for a tilt-rotor aircraft, comprises at least one control lever which is movable relative to a control lever support. The control lever support is said to have a rotational position that varies in correspondence with the tilt of the rotor of the aircraft. In one example, the control lever support is said to be movable by an actuator between a first position, in the airplane mode of the aircraft, in which the control lever moves substantially horizontally and a second position, in the helicopter mode of the aircraft, in which the control lever moves substantially vertically. Like a multiple engine aircraft, the controller is split to provide separate thrust control for each engine and follows an arc during actuation.

Another example is U.S. Pat. No. 6,695,264, filed by Schaeffer, et al., entitled "Power lever tactile cueing system", and is said to teach a power lever tactile cueing system for providing tactile alerts to pilots as operational limits of an aircraft are approached. The cueing system is said to generate a tactile cue comprising a variable dive rate and a variable friction force on a power lever of an aircraft, and also provides spring-like tactile cues when power commands reach a predetermined operating limit, without the use of mechanical springs. It is also said that the cueing system trims down the power lever position and provides the additional friction force based upon the state of the aircraft and engine, and can remain activated until the aircraft is again operated within its operational limits, which the pilot may override.

SUMMARY OF THE INVENTION

In one embodiment, the present invention includes a thrust control apparatus for a tiltrotor craft comprising: a thrust control handle; a first and a second bar connected to the thrust control handle, wherein each of the first and second bars are connected by a first and second pivot, respectively, wherein the first and second pivot are connected to a floor support; a first end of a transverse bar connected to the first bar; a linker connected to a second end of the transverse bar; and a crankbell connected to a crankbell pivot that is connected to the floor support below the first and a second bars, wherein a first end of the crankbell is connected to the linker. In one aspect, the thrust control handle has a substantially linear motion that controls engine thrust, and the crankbell transfers the substantially linear motion of the handle into a substantially perpendicular motion that engages an engine thrust control at a second end of the crankbell. In another aspect, the tiltrotor craft is a vertical take off and landing aircraft. In another aspect, the thrust control handle comprises at least one tiltrotor angle controller. In another aspect, the substantially linear motion is parallel to a floor of a cockpit. In another aspect, the substantially linear motion at the thrust control handle is converted into a lateral motion under a floor of the cockpit at a compressed ratio. In another aspect, the thrust control handle comprises one or more finger and/or thumb controls. In another aspect, the thrust control handle comprises a nacelle control thumbwheel. In another aspect, the thrust control apparatus is provided in a releasable container that connects to an existing rotorcraft cockpit configuration. In another aspect, the thrust control apparatus is provided in a releasable container that further comprises an adjustable armrest. In another aspect, a grip support is connected by a first and second grip support pivot to the first and second bar and provided between the thrust control handle and the first and second bars. In another aspect, the linear motion has at least one of: one or more stops or locking positions at different known thrust positions; one or more markings that match known thrust positions; the thrust control handle does not require any friction to remain at any position along the linear range of thrust control; or the thrust control handle can rotate to provide yaw control. In another aspect, the linker, the crankbell, and/or the transverse bar further comprises an adjustable linker.

Another embodiment of the present invention includes a method of providing thrust control to a rotorcraft comprising: providing a thrust control handle; connecting a first and a second bar to the thrust control handle, wherein each of the first and second bars connect by a first and second pivot to a floor support; connecting a first end of a transverse bar to the first bar; providing a linker that connects to a second end of the transverse bar; and connecting a crankbell to a crankbell pivot that connects to the floor support and below the first and a second bars, wherein a first end of the crankbell is connected to the linker, wherein the thrust control handle has a substantially linear motion that controls engine thrust, and the crankbell transfers the substantially linear motion of the handle into a substantially perpendicular motion that engages an engine thrust control at a second end of the crankbell. In one aspect, the tiltrotor craft is a vertical take off and landing aircraft. In another aspect, the thrust control handle comprises at least one tiltrotor angle controller. In another aspect, the substantially linear motion is parallel to a floor of a cockpit. In another aspect, the substantially linear motion at the thrust control handle is converted into a lateral motion under a floor of the cockpit at a compressed ratio. In another aspect, the thrust control handle comprises one or more finger and/or thumb controls. In another aspect, the thrust control handle comprises a nacelle control thumbwheel. In another aspect, the thrust control apparatus is provided in a releasable container that connects to an existing rotorcraft cockpit configuration. In another aspect, the thrust control apparatus is provided in a releasable container that further comprises an adjustable armrest. In another aspect, a grip support is connected by a first and second grip support pivot to the first and second bar and provided between the thrust control handle and the first and second bars. In another aspect, the thrust control motion is not arcuate or rotary. In another aspect, the linear motion has at least one of: one or more stops or locking positions at different known thrust positions; one or more markings that match known thrust positions; the thrust control handle does not require any friction to remain at any position along the linear range of thrust control; or the thrust control handle can rotate to provide yaw control. In another aspect, the linker, the crankbell, or the transverse bar can further comprise an adjustable linker.

Yet another embodiment of the present invention includes a thrust control apparatus kit for a tiltrotor craft comprising: a first and a second bar connectable to a grip support adapted to connect to a thrust control handle, wherein each of the first and second bars are connected by a first and second pivot, respectively, to a floor support; a first end of a transverse bar connected to the first bar; an adjustable linker connected to a second end of the transverse bar; and a crankbell connected to a crankbell pivot connect to the floor support and below the first and a second bars, wherein a first end of the crankbell is connected to the adjustable linker, wherein the thrust control handle has a substantially linear motion that controls engine thrust, and the crankbell transfers the substantially linear motion of the handle into a substantially perpendicular motion that engages an engine thrust control at a second end of the crankbell, wherein the kit can replace an rotorcraft collective that has an arcuate or rotary motion with the substantially linear motion. In one aspect, the kit further comprises the thrust control handle that comprises one or more finger and/or thumb controls. In another aspect, the kit further comprises the thrust control handle comprises a nacelle control thumbwheel. In another aspect, the thrust control apparatus is provided in a releasable container that connects to an existing rotorcraft cockpit configuration. In another aspect, the thrust control apparatus is provided in a releasable container that further comprises an adjustable armrest. In another aspect, the grip support has a substantially linear motion and further comprises at least one of: one or more stops or locking positions at different known thrust positions; one or more markings that match known thrust positions; the thrust control handle does not require any friction to remain at any position along the linear range of thrust control; or the thrust control handle can rotate to provide yaw control. In another aspect, the kit further comprises one or more interchangeable thrust control handles comprising different finger control configurations.

Another embodiment of the present invention includes a method of controlling thrust in a tiltrotor craft comprising: providing a grip support adapted to connected to a thrust control handle, wherein the grip support is connected to a first and a second bar, wherein each of the first and second bars are connected by a first and second pivot, respectively, to a floor support, a first end of a transverse bar connected to the first bar, an adjustable linker connected to a second end of the transverse bar, and a crankbell connected to a crankbell pivot connect to the floor support and below the first and a second bars to provide the thrust control handle with a substantially linear motion; and controlling a thrust of one or more engines of the tiltrotor craft by sliding the thrust control handle in the substantially linear motion. In one aspect, method further comprises attaching an interchangeable thrust control handle to the grip support. In another aspect, the thrust control motion is not arcuate or rotary.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Figure 1:
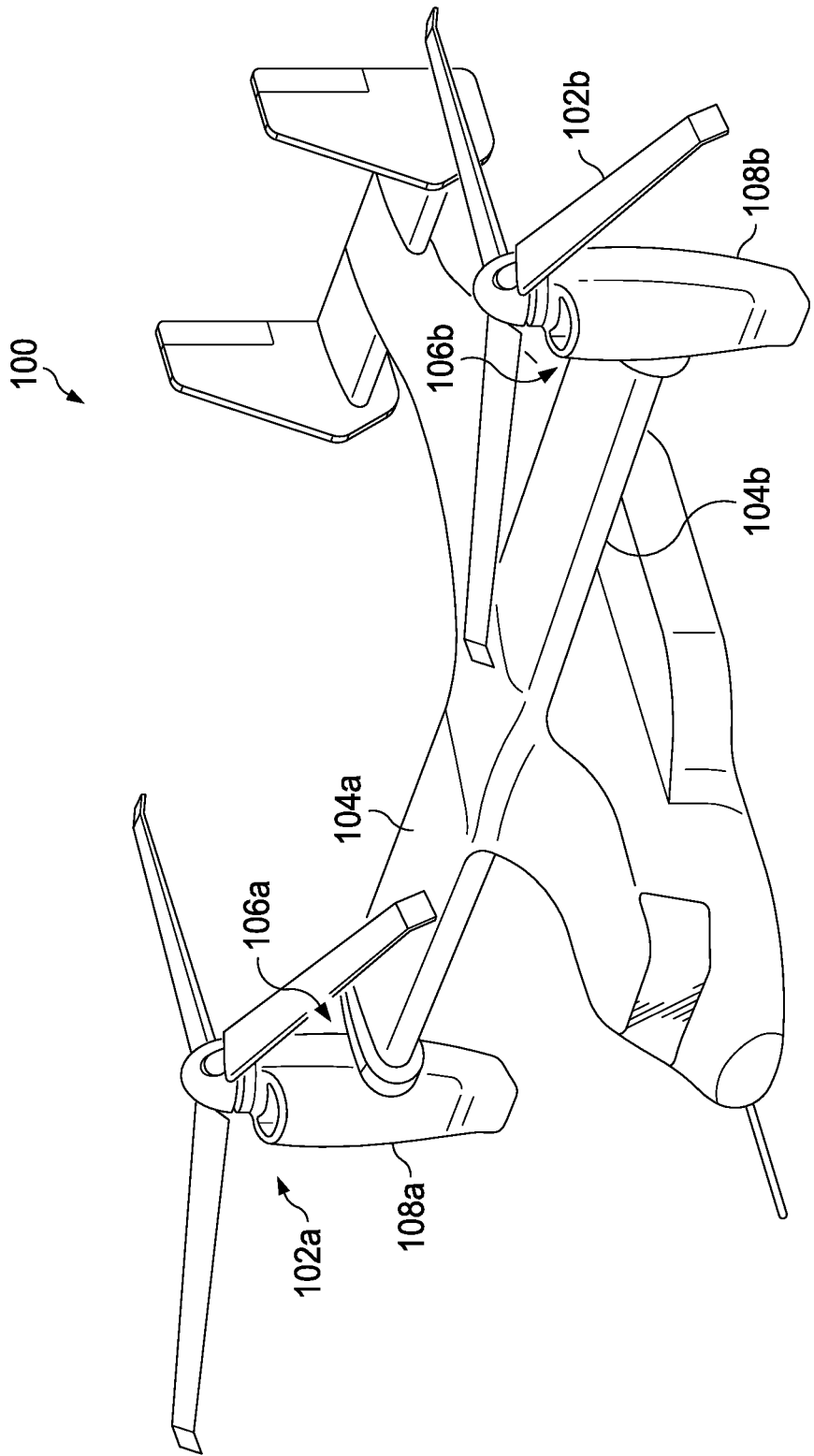
FIG. 1 shows a perspective view of a tiltrotor aircraft that can use the present application.

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The present invention is a thrust control that replaces the collective type controller in a rotorcraft, e.g., a tiltrotor aircraft. The thrust control lever of the present invention has a substantially linear motion that controls engine thrust, which is familiar to tilt rotor pilots that are familiar with a collective type of control. The thrust control lever design of the present invention is unique in that the motion of forward and aft transmits motion side-to-side below the floor plate without any modifications to existing design or hardware. In fact, the present invention can be provided in the form of a kit that fits in, and replaces, an existing collective-type thrust controller. The present inventors have found certain advantages to the present invention, namely, eliminating the need to have friction or springs of the collective, eliminating the need for the pilot to lean down to pick-up the collective, and in certain aircraft, to permanently hold the collective to maintain thrust. The present invention allows the pilot to remain seated with full control of the aircraft without leaning into and from the collective during operations, thereby allowing for full awareness of the airspace and aircontrols.

The thrust control lever moves on a level plane of motion. The motion travel is adjustable, e.g., around 6.0 inches of travel at the grip and transmits to a side-to-side motion of, e.g., 2.5 inches or more depending on the adjustment. Presently, there is no mechanism that will provide this unique motion in a rotorcraft. Further, existing rotorcraft can be retrofitted with the thrust control lever apparatus of the present invention. As with pre-existing rotorcraft, the thrust control lever of the present invention can include any of the existing hand controls applicable to the aircraft type and the load-out of the aircraft, e.g., whether for civilian or military use, or even specific types of attachments and/or display controllers applicable to either use. The thrust control handle can be any Hands On Throttle-And-Stick (HOTAS) buttons, switches, joysticks, control thumbwheels (e.g., a nacelle control thumbwheel), rotary, linear, or other hand controls common to aircraft.

For example, FIG. 1 shows a tiltrotor aircraft 100 that utilizes the system in accordance with the present application. Tiltrotor aircraft 100 includes rotor assemblies 102a and 102b that are carried by wings 104a and 104b, and are disposed at end portions 106a and 106b of wings 104a and 104b, respectively. Rotor assemblies 102a and 102b include nacelles 108a and 108b, which carry the engines and transmissions of tilt rotor aircraft 100. Tilt rotor assemblies 102a and 102b move or rotate relative to wing members 104a and 104b between a helicopter or hover mode in which tilt rotor assemblies 108a and 108b are tilted upward, such that tilt rotor aircraft 100 flies like a conventional helicopter; and an airplane or cruise mode in which tilt rotor assemblies 108a and 108b are tilted forward, such that tilt rotor aircraft 100 flies like a conventional propeller driven aircraft.

Figure 2:
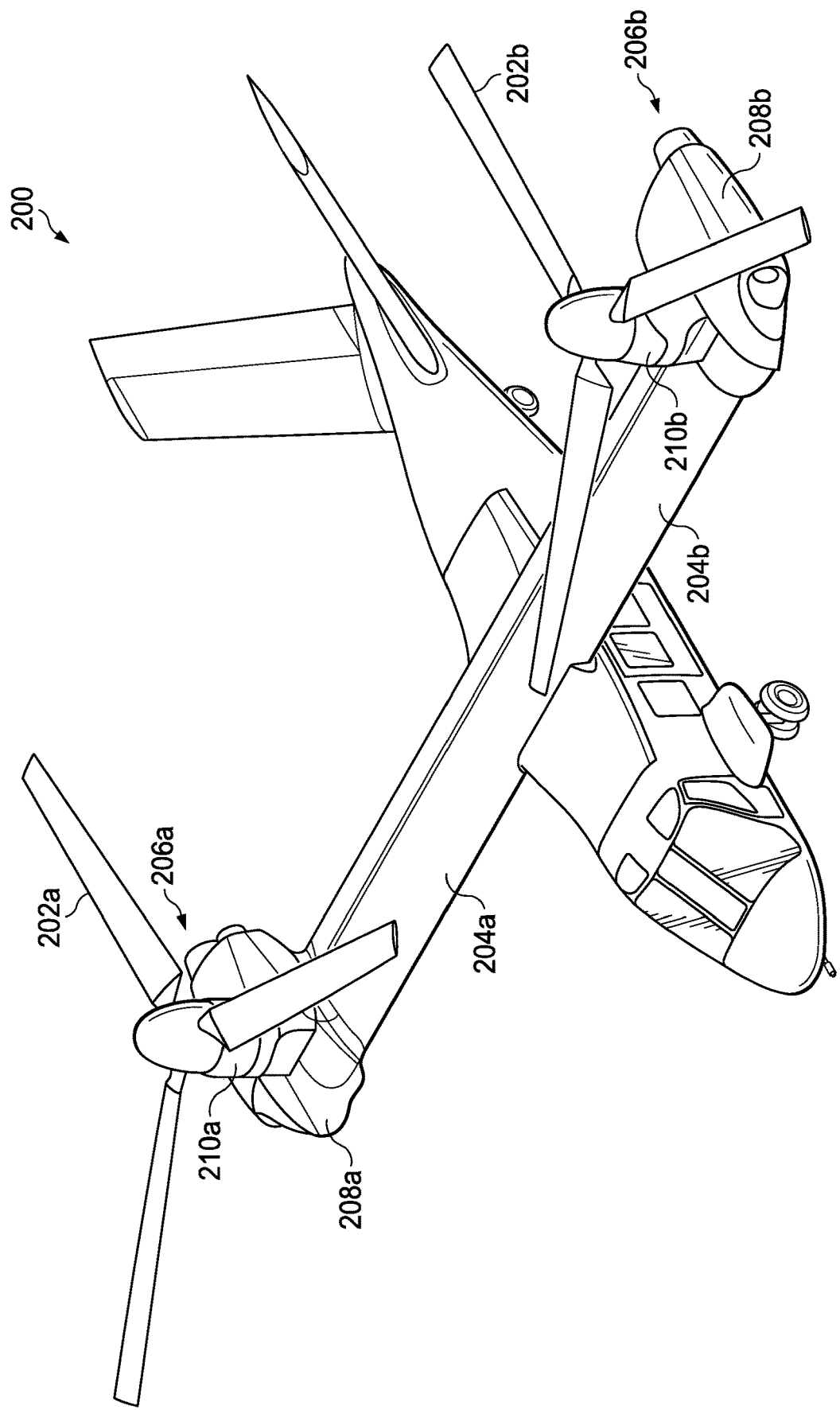
FIG. 2 shows a perspective view of another tiltrotor aircraft that can also use the present application.

FIG. 2 shows another tiltrotor aircraft 200 that utilizes the system in accordance with the present application. Tiltrotor aircraft 200 includes rotor assemblies 202a and 202b that are carried by wings 204a and 204b, and are disposed at end portions 206a and 206b of wings 204a and 204b, respectively. Rotor assemblies 202a and 202b include nacelles 208a and 208b, which include the engines and transmissions of tilt rotor aircraft 200. In this embodiment, the engines are fixed to the wing and do not rotate, rather, only the pylons with the rotor assemblies 202a and 202b rotate. Tilt rotor assemblies 202a and 202b move and rotate relative to wing members 204a and 204b and the nacelles 208a and 208b. The tilt rotor assemblies 208a and 208b do not more relative to the wing members 204a and 204b. Instead, during the transition between a helicopter or hover mode only the pylons 210a and 210b with the rotor assemblies 202a and 202b rotate to redirect the thrust from the rotor assemblies 202a and 202b. The rotorcraft 200 is still able to fly like a conventional helicopter; and an airplane or cruise mode in which one of the rotors are tilted forward, such that tilt rotor aircraft 200 flies like a conventional propeller driven aircraft.

In one non-limiting example, a nacelle control thumbwheel is incorporated into the grip, which control is rotated to control the position of the rotors in a tiltrotor aircraft. One such example is taught in U.S. Pat. No. 6,644,588, issued to Bell Helicopter Textron Inc., relevant portions incorporated herein by reference. The thumbwheel can have a knurled edge that protrudes above a grip surface. The thumbwheel will often be spring-biased in a selected position, but may be rotated by the pilot. It will be understood by the skilled artisan that the thumbwheel may have different configurations, e.g., it is possible to substitute the thumbwheel, e.g., with a sliding knob, a joystick, or any other suitable electronic-mechanical input device.

Figure 3:
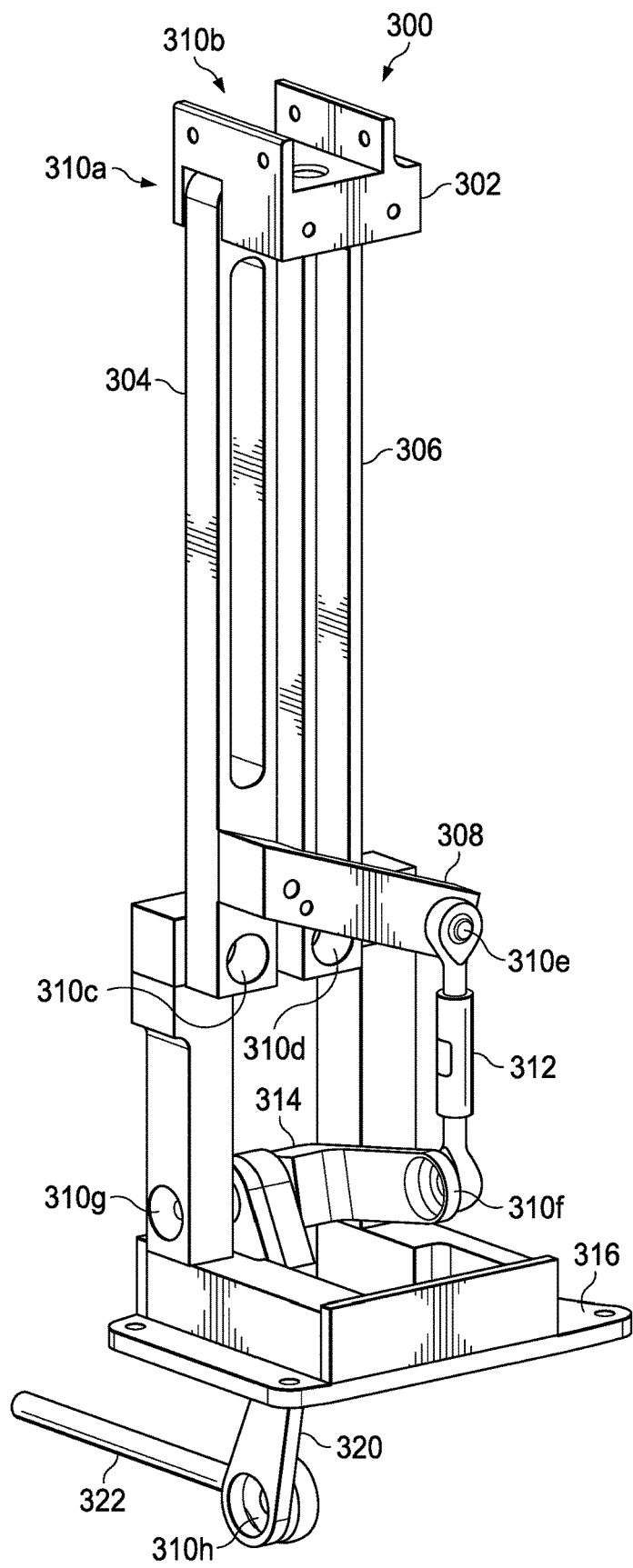
FIG. 3 shows an isometric view of the thrust control of the present invention.

Often, as illustrated in FIGS. 2 and 3 of U.S. Pat. No. 6,644,588, issued to Bell Helicopter Textron Inc., a thumbwheel or equivalent is spring loaded by any conventional spring mechanism to provide, e.g., four detent positions: a first detent, a second detent, a third detent, and a fourth detent. In addition, thumbwheel has a forward hardstop position and an aft hardstop position. The thumbwheel will be prevented from rotating in the forward direction beyond forward hardstop, and prevented from rotating in the aft direction beyond aft hardstop. For example, the first detent, often referred to as the "nacelle control off detent," is the default detent and is positioned about 90° up from grip surface. First detent is the default detent because thumbwheel is spring biased to return to first detent when released by the pilot. The second detent, which is often referred to as the "nacelle down detent," is positioned about 15° forward from first detent. The forward hardstop is positioned about 5° forward from second detent. The third detent, often referred to as the "nacelle up detent," is positioned about 15° aft from first detent. Finally, the fourth detent, commonly referred to as the "emergency up detent," is positioned about 10° aft from third detent. The aft hardstop is positioned about 5° aft from fourth detent. Thus, the total rotation of thumbwheel from forward hardstop to aft hardstop is about 50°. Again, this is simply one example of a rotor position control thumbwheel that can be incorporated into a thrust control grip.

Commonly, a nacelle control system has three modes of operation: (1) a semi-automatic nacelle control mode; (2) a fixed rate command mode; and (3) a maintenance control mode. The automatic mode switching is provided via a Flight Control Computer (FCC) that can switch among the three modes of operation. In all three modes of operation, the thumbwheel returns to first detent when released by the pilot.

FIG. 3 shows an isometric view of the thrust control 300 of the present invention. A thrust control handle 800 (FIG. 8) is connected to a grip support 302, which is connected to a driver bar 304 (first bar) and a follower bar 306 (second bar) by first pivot 310a and second pivot 310b. The driver bar 304 and the follower bar 306 are connected to a floor support 316 by pivot third 310c and fourth pivot 310d, which together provide for a smooth generally linear motion at the grip support 302 when moved from a forward to an aft position. The driver bar 304 is connected to a transverse bar 308 (although the transverse bar could alternative be connected to the follower bar 306, or both via one or more pivot(s)(not depicted)), which is then connected to a linker 312, which can be an adjustable linker to provide additional control. Alternatively, the transverse bar 308 or the crankbell 314 can also be adjustable. The linker 312 is connected via fifth pivot 310e to the transverse bar 308 at a first end, and at the second end the linker 312 is connected via sixth pivot 310f to the crankbell 314. When the grip support 302 is actuated in a linear motion, the transverse bar 308 raises and lowers the linker 312, which lowers and raises a first end of the crankbell 314 which changes the linear motion to a perpendicular motion at the second end of the crankbell 320, which in this embodiment also changes the ratio of motion from, e.g., a 6 inch (12.5 cm) linear motion at the grip support 302, to a perpendicular 2 inch (5 cm) motion. The crankbell 314 is connected via seventh pivot 310g to the floor support 316 and to the second end of the crankbell 320. The crankbell can be unitary or made from two separate parts. Of course, the ratio can be varied by modifying the length of the linear motion at the grip support 302 versus the motion of the crankbell 314, which will be known to the skilled artisan in light of the present disclosure. The second end 320 of the crankbell 314, connects to a thrust control lever 322, which is connected via eighth pivot 310h.

Figure 4:
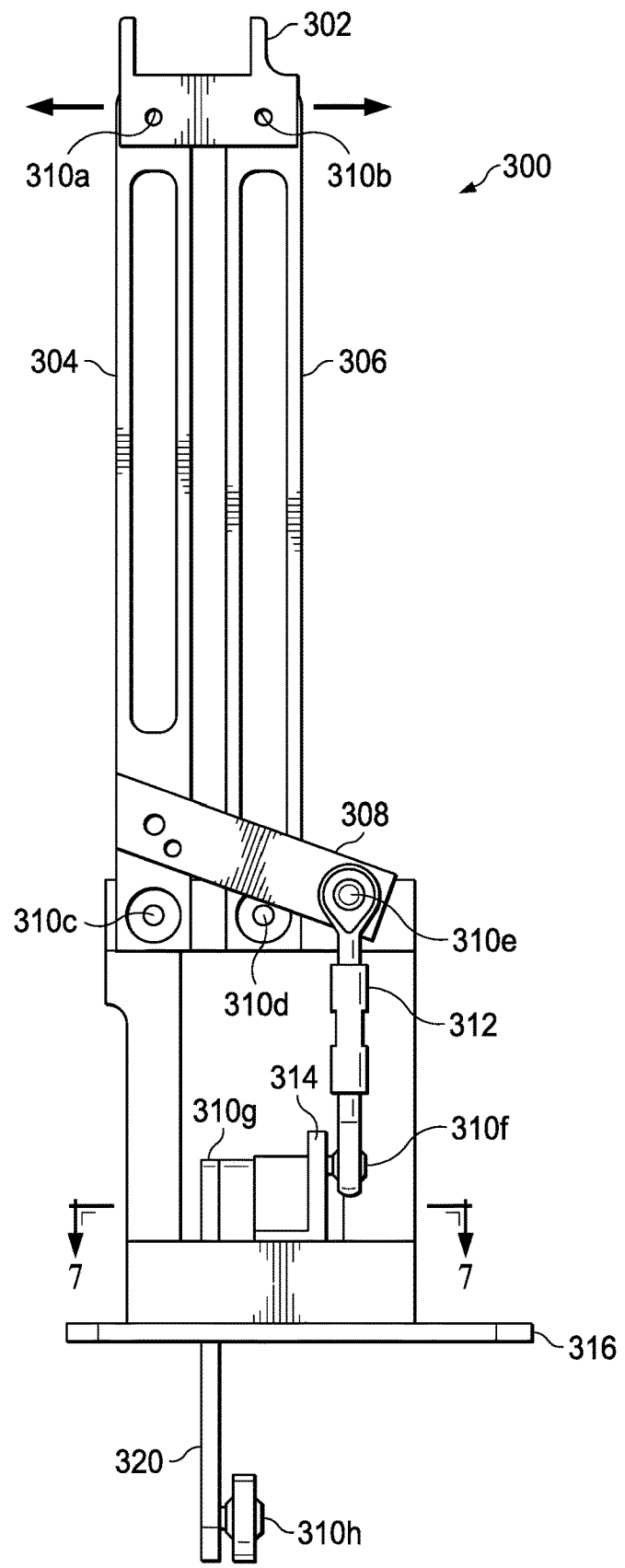
FIG. 4 shows a side view of the thrust control of the present invention.

FIG. 4 shows a side view of the thrust control 300 of the present invention, in which the grip support 302, is connected to a driver bar 304 and a follower bar 306 by first pivot 310a and second pivot 310b. The driver bar 304 and the follower bar 306 are connected to the floor support 316 by third pivot 310c and fourth pivot 310d, which together provide for a smooth generally linear motion at the grip support 302 when moved from a forward to an aft position. The driver bar 304 is connected to a transverse bar 308 (although the transverse bar could alternative be connected to the follower bar 306, or both via one or more pivot(s)), which is then connected to the linker 312, which can be an adjustable linker to provide additional control. Alternatively, the transverse bar 308 or the crankbell 314 can also be adjustable. The first end of the crankbell 314 is connected via seventh pivot 310g to the floor support 316 and to the second end of the crankbell 320 via eighth pivot 310h.

Figure 5:
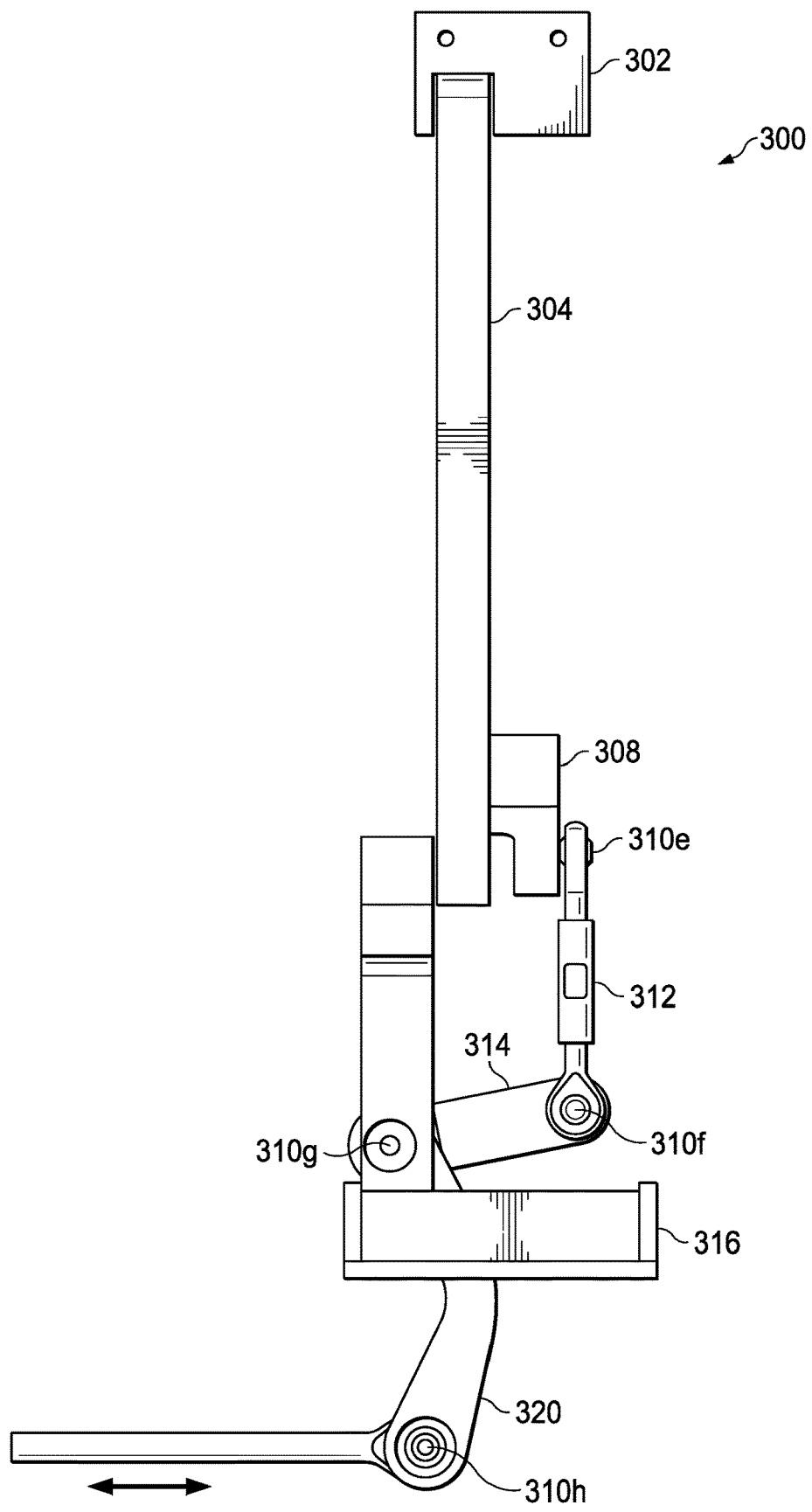
FIG. 5 shows a front view of the thrust control of the present invention.

FIG. 5 shows a front view of the thrust control 300 of the present invention, in which the grip support 302 is connected to a driver bar 304. The driver bar 304 is connected to the floor support 316. The driver bar 304 is connected to a transverse bar 308, which is then connected to the linker 312, which can be an adjustable linker to provide additional control such as a turnbuckle. Alternatively, the transverse bar 308 or the crankbell 314 can also be adjustable.

Figure 6:
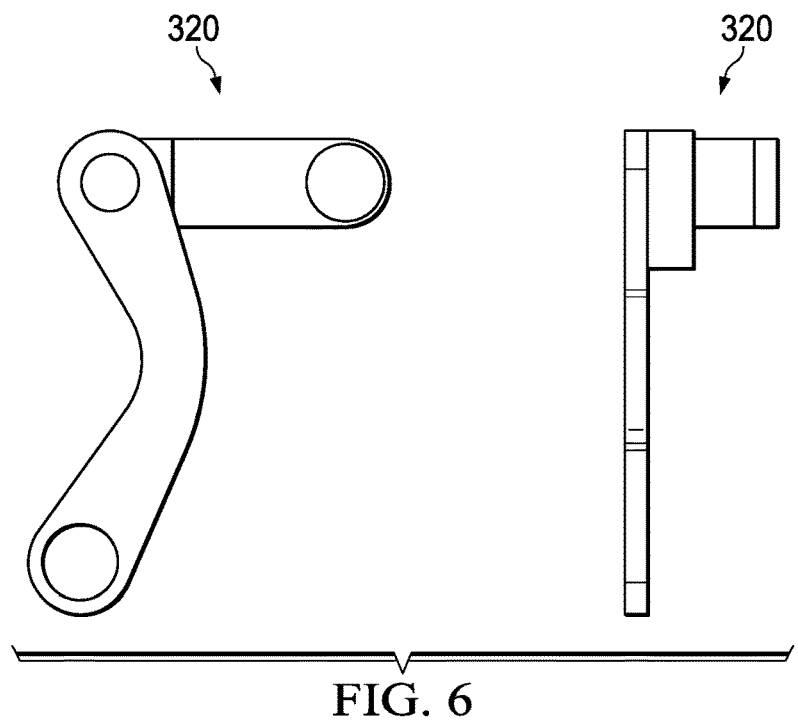
FIG. 6 shows a side and a front view of the crankbell of the present invention.

FIG. 6 shows a side and a front view of the crankbell 320. The crankbell 320 transfers the forward and aft motion of the handle grip into a lateral motion under the floor of the cockpit by connecting to a thrust control bar.

Figure 7:
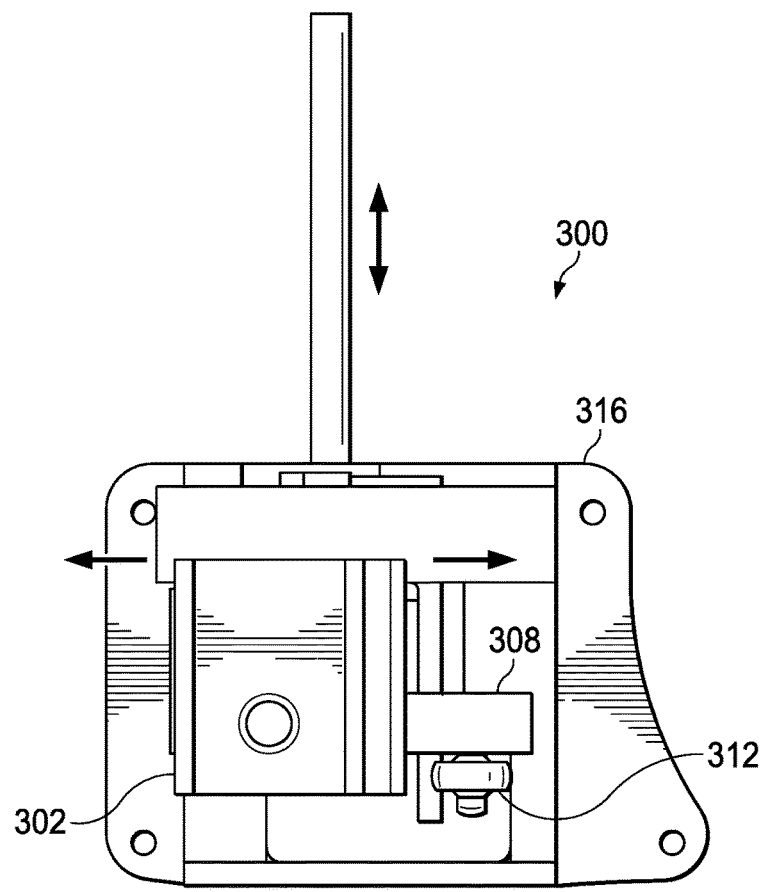
FIG. 7 shows a top-view of the thrust control of the present invention.

FIG. 7 shows a top-view of the thrust control 300 of the present invention, in which the grip support 302 is shown as moving forward and aft. The transverse bar 308 is connected to the linker 312, which can be an adjustable linker to provide additional control. The floor support 316 is shown with openings for attaching the floor support 316 to the floor or other part of the cockpit, and the perpendicular linear motion of the thrust control is shown.

Figure 8:
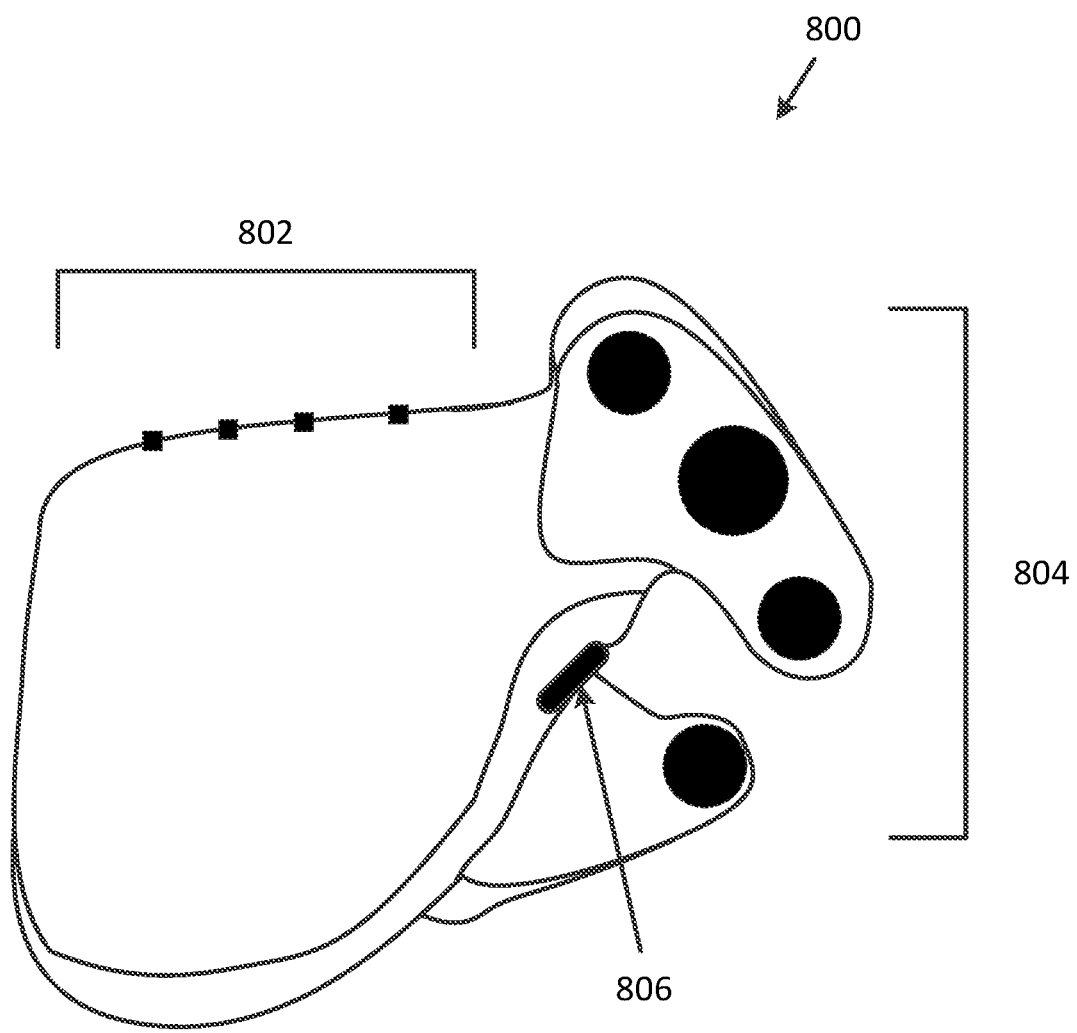
FIG. 8 shows a schematic view of the thrust control handle of the present invention.

FIG. 8 shows a schematic view of the thrust control handle 800 of the present invention. Thrust control handle 800 may include one or more finger controls 802 and/or thumb controls 804. These controls 802, 804 may include a tiltrotor angle controller or a nacelle control thumbwheel 806. Note that the thrust control handle 800 can be interchangeable with other handles.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A thrust control apparatus for a tiltrotor craft comprising:
   a thrust control handle;
   a three-bar assembly comprising a first bar, a second bar, and a transverse bar, wherein the transverse bar is adjustable above a floor support;
   the first bar and the second bar connected to the thrust control handle by a first pivot and a second pivot, respectively, and to the floor support by a third pivot and a fourth pivot, respectively, wherein the thrust control handle has a substantially linear motion that linearly controls engine thrust when moved from a forward position to an aft position in a motion that is substantially parallel to the floor support;
   a first end of the transverse bar connected to the first bar, the second bar, or both the first bar and the second bar;
   a linker connected to a second end of the transverse bar; and
   a crankbell connected to the linker at a first end of the crankbell and to a crankbell pivot, the crankbell pivot connected to the floor support below the first bar and the second bar.

2. The apparatus of claim 1, wherein the crankbell transfers the substantially linear motion of the thrust control handle into a substantially perpendicular motion that engages an engine thrust control at a second end of the crankbell.

3. The apparatus of claim 1, wherein the tiltrotor craft is a vertical take off and landing aircraft.

4. The apparatus of claim 1, wherein the thrust control handle comprises at least one tiltrotor angle controller.

5. The apparatus of claim 1, wherein the apparatus is configured such that a substantially linear motion at the thrust control handle is converted into a lateral motion under a floor at a compressed ratio.

6. The apparatus of claim 1, wherein the thrust control handle comprises one or more finger and/or thumb controls.

7. The apparatus of claim 1, wherein the thrust control handle comprises a nacelle control thumbwheel.

8. The apparatus of claim 1, wherein a grip support is connected by the first and second pivot to the first and second bar and provided between the thrust control handle and the first and second bars.

9. The apparatus of claim 1, wherein the linker or the crankbell are adjustable.

10. A method of providing thrust control to a rotorcraft comprising:
    providing a thrust control handle;
    providing a three-bar assembly comprising a first bar, a second bar, and a transverse bar, wherein the transverse bar is adjustable above a floor support;
    connecting the first bar and the second bar to the thrust control handle by a first pivot and a second pivot, respectively, wherein each of the first bar and the second bar connects by a third pivot and a fourth pivot respectively, to the floor support, wherein the thrust control handle has a substantially linear motion that linearly controls engine thrust when moved from a forward position to an aft position in a motion that is substantially parallel to the floor support;
    connecting a first end of the transverse bar to the first bar, the second bar, or both the first bar and the second bar;
    connecting a linker to a second end of the transverse bar; and
    connecting a crankbell to the linker at a first end of the crankbell and to a crankbell pivot that connects to the floor support below the first bar and second bar, wherein the thrust control handle has a substantially linear motion that controls engine thrust, and wherein the crankbell transfers the substantially linear motion of the thrust control handle into a substantially perpendicular motion that engages an engine thrust control at a second end of the crankbell.

11. The method of claim 10, wherein the tiltrotor craft is a vertical take off and landing aircraft.

12. The method of claim 10, wherein the thrust control handle comprises at least one tiltrotor angle controller.

13. The method of claim 10, wherein the substantially linear motion at the thrust control handle is converted into a lateral motion under a floor at a compressed ratio.

14. The method of claim 10, wherein the thrust control handle comprises one or more finger and/or thumb controls.

15. The method of claim 10, wherein the thrust control handle comprises a nacelle control thumbwheel.

16. The method of claim 10, wherein a grip support is connected by a first and second grip support pivot to the first and second bar and provided between the thrust control handle and the first and second bars.

17. The method of claim 10, wherein the thrust control motion is minimally arcuate or rotary.

18. The method of claim 10, wherein the linker or the crankbell are adjustable.

19. A thrust control apparatus kit for a tiltrotor craft comprising:
    a three-bar assembly comprising a first bar, a second bar, and a transverse bar, wherein the transverse bar is adjustable above a floor support;
    the first bar and the second bar connectable to a grip support by a first pivot and a second pivot, respectively, the grip support adapted to connect to a thrust control handle, wherein each of the first and second bars are connectable by a third and fourth pivot, respectively, to the floor support;
    a first end of the transverse bar connected to the first bar, the second bar, or both the first bar and the second bar;
    an adjustable linker connected to a second end of the transverse bar; and
    a crankbell connectable to the adjustable linker at a first end of the crankbell and connectable to a crankbell pivot, connectable to the floor support below the first bar and the second bar, wherein the thrust control handle has a substantially linear motion, wherein the motion is substantially parallel to the floor and wherein the thrust control handle linearly controls engine thrust when moved from a forward position to an aft position, wherein the crankbell transfers the substantially linear motion of the handle into a substantially perpendicular motion that engages an engine thrust control at a second end of the crankbell; and wherein the kit can replace a rotorcraft collective that has an arcuate or rotary motion with the substantially linear motion.

20. The kit of claim 19, wherein the kit further comprises the thrust control handle that comprises one or more finger and/or thumb controls.

21. The kit of claim 19, wherein the kit further comprises the thrust control handle comprises a nacelle control thumbwheel.

22. The kit of claim 19, wherein the kit further comprises one or more interchangeable thrust control handles comprising different finger control configurations.

23. A method of controlling thrust in a tiltrotor craft comprising:
providing:
a grip support adapted to be connected to a thrust control handle;
a three bar assembly comprising a first bar, a second bar, and a transverse bar, wherein the transverse bar is adjustable above a floor support, wherein the grip support is connected to the first bar and the second bar by a first pivot and a second pivot, respectively, wherein the first bar and the second bar are connected by a third pivot and a fourth pivot, respectively, to the floor support, and wherein a first end of the transverse bar is connected to the first bar, the second bar, or both the first bar and the second bar;
an adjustable linker connected to a second end of the transverse bar; and
a crankbell connected to a crankbell pivot, the crankbell pivot connected to the floor support below the first bar and the second bar to provide the thrust control handle with a substantially linear motion, wherein the substantially linear motion of the thrust control handle is parallel to the floor support and wherein the thrust control handle does not require any friction to remain at any position along the linear range of thrust control; and
linearly controlling a thrust of one or more engines of the tiltrotor craft by sliding the thrust control handle in the substantially linear motion.

24. The method of claim 23, further comprising attaching an interchangeable thrust control handle to the grip support.

25. The method of claim 23, wherein the thrust control motion is minimally arcuate or rotary.

* * * * *